UNITED STATES PATENT OFFICE.

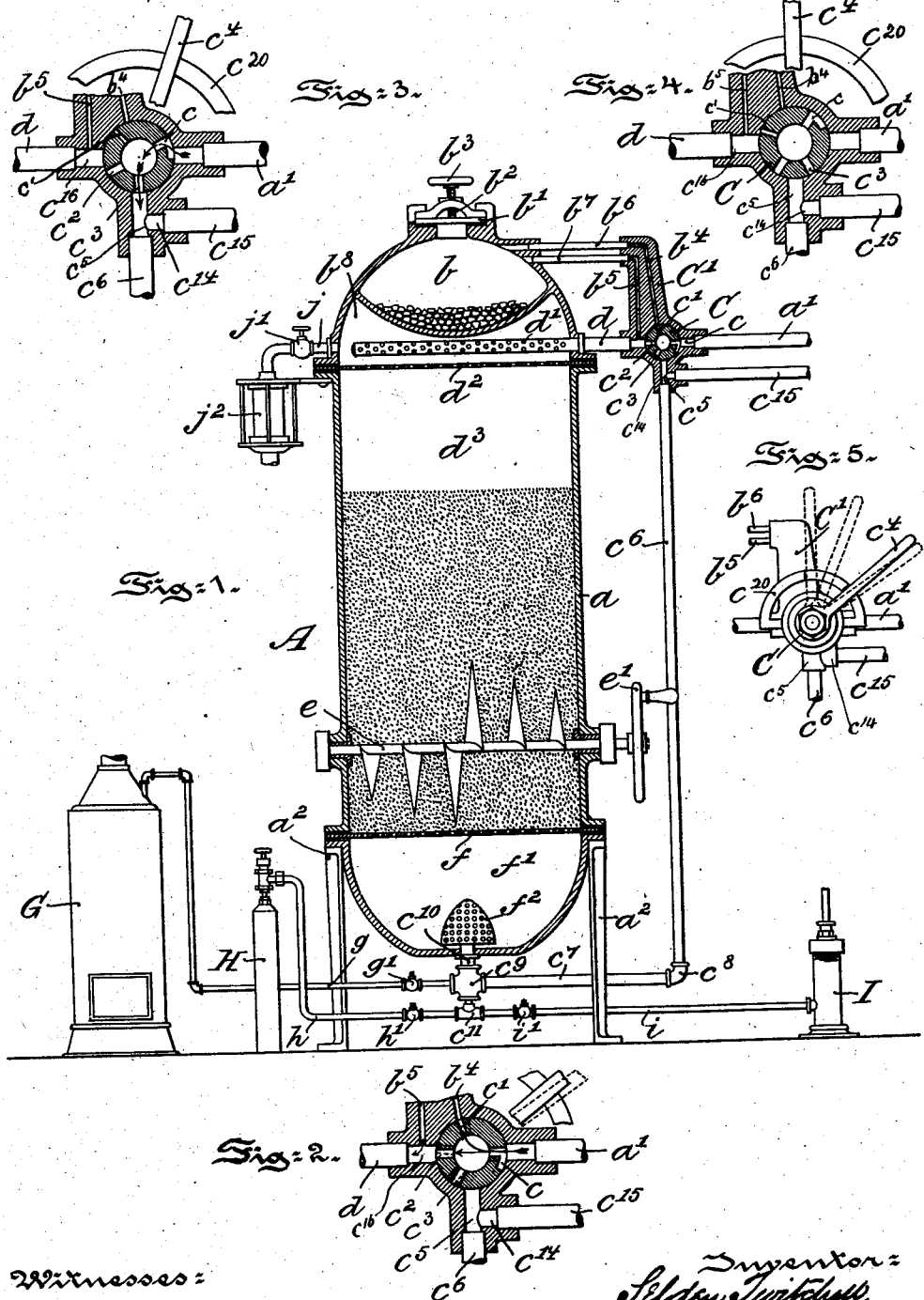
(No Model.)
S. TWITCHELL.
FILTERING APPARATUS.
No. 605,152.   Patented June 7, 1898.

SELDEN TWITCHELL, OF PHILADELPHIA, PENNSYLVANIA.

FILTERING APPARATUS.

SPECIFICATION forming part of Letters Patent No. 605,152, dated June 7, 1898.

Application filed December 27, 1897. Serial No. 663,806. (No model.)

*To all whom it may concern:*

Be it known that I, SELDEN TWITCHELL, a citizen of the United States, residing at the city of Philadelphia, in the county of Philadelphia and State of Pennsylvania, have invented certain new and useful Improvements in Filtering Apparatus, of which the following is a specification.

My invention has relation to an apparatus for filtering water or other fluids; and in such connection it relates particularly to the general construction and arrangement of such an apparatus.

The principal objects of my invention are, first, to provide a comparatively simple, efficient, and reliable apparatus for filtering water or other fluids and an apparatus in which the filtering media can be in the one plant or appliance aerated, carbonated, or sterilized without disorganization of the apparatus, and, second, to provide an apparatus wherein filtering of a fluid may be efficiently carried out in an economical and reliable manner and cleansing of the apparatus of settling or accumulating impurities expeditiously removed without disorganization of the apparatus and a germ-proof water or other fluid obtained.

My invention, stated in general terms, consists of a filtering apparatus when constructed and arranged in substantially the manner hereinafter described and claimed.

The nature and characteristic features of my invention will be more fully understood from the following description, taken in connection with the accompanying drawings, forming part thereof, in which—

Figure 1 is a view, partly in vertical section and partly in elevation, of an apparatus embodying features of my invention. Fig. 2 is a vertical central sectional view, enlarged, of the valve of Fig. 1, showing the inlets and outlets for the fluid to and from the apparatus. Figs. 3 and 4 are respectively similar views of the four-way valve with its lever and pointer, showing the positions of the ports of the valve for cleansing the filtering media and also the closed position of the ports of the valve; and Fig. 5 is a front elevational view of the valve and its connections, in broken section, to the coagulant and filtering chambers and to the bottom of the filtering-chamber, and also showing the lever for operating said valve and its pointer or indicator.

Referring to the drawings, A represents the apparatus of my invention provided in the top with a chamber $b$ for a coagulant, such as alum or other suitable matter, having a contracted throat sealed or closed by a plate $b'$ and held to place by a clamp $b^2$, provided with a tightening device $b^3$. This chamber is adapted to receive a percentage of the incoming contaminated fluid or water from the supply and after becoming charged with the coagulant of said chamber mixes with the main supply to precipitate any albumen or other foreign matter contained in the water or other fluid, thereby insuring a better treatment of the fluid by the filtering of the same, as will be hereinafter more fully explained and also better understood from the more complete description of other parts and functions of the apparatus for the purposes of my present invention.

$a'$ is an inlet-pipe from any suitable source of supply to a valve C, having ports $c$, $c'$, $c^2$, and $c^3$ provided therein and an operating-lever $c^4$, and adjacent thereto is suitably located a pointer or indicator $c^{20}$.

$b^4$ and $b^5$ are outlet and inlet connections, respectively, in the casting C', in which the valve C is mounted, as clearly illustrated in Fig. 1. This casting C' has pipes or nipples $b^6$ and $b^7$ to the coagulant-chamber $b$ for permitting of the flow in more or less minute streams of the contaminated water or other fluid containing foreign matter through the ports $c$ and $c'$ when the valve C has been caused, by means of the operating-lever $c^4$, to occupy the position illustrated in Fig. 1 and discharging through the pipe $b^7$ and mixing with the main supply channel $b^5$ and mixing with the main supply through the valve C, beyond the port $c^2$ thereof, in the channel $c^{16}$ of the casting C', leading to the pipe $d$, perforated at $d'$ in the chamber $b^8$ in the upper part of the apparatus A beneath the coagulant-chamber $b$, and thereby aiding by such mixture at the point mentioned in the precipitation of albumen or other matter in the fluid or water undergoing treatment in the apparatus A. The perforated pipe $d'$ is located above a disk or perforated diaphragm $d^2$, which separates the filtering-media chamber $d^3$, containing finely-powdered granite, charcoal, sand, slag, or other preferred filtering matter, from the chamber $b^8$. In the lower portion of the chamber $d^3$ is provided a blade-agitating device $e$, journaled to the housing $a$ of the apparatus and operated by a hand-wheel $e'$.

$f$ is a perforated diaphragm or disk forming the bottom of the filtering-media chamber $d^3$ and separating the same from a filtered fluid-receiving chamber $f'$, provided therein with a sprayer or rose $f^2$.

The apparatus is preferably supported by a series of standards $a^2$, as illustrated in Fig. 1 of the drawings.

In the base of the casting C' is provided an outlet $c^5$, joined to a vertical pipe $c^6$, having a horizontal extension $c^7$, coupled together by an elbow $c^8$ and the inner end threaded and secured into a coupling $c^9$, connected by means of a nipple $c^{10}$ with the sprayer or rose $f^2$. This coupling $c^9$ at its opposite end is, by means of a pipe connection $g$, provided with a stop-cock $g'$, connected with a sterilizing apparatus G. The coupling $c^9$ is provided with a T connection $c^{11}$, which is united to pipes $h$ and $i$, provided with stop-cocks $h'$ and $i'$. These pipes $h$ and $i$ are respectively connected with carbonating and aerating appliances H and I. In the wall of the chamber $b^8$ is provided an outlet-pipe $j$, having a stop-cock $j'$ and sight-gage $j^2$. This device is provided for determining when accumulating impurities in the filtering-media chamber $d^3$ are removed.

In the casting C' is provided an opening $c^{14}$, having an outlet-pipe $c^{15}$ for the escape therethrough of the thoroughly-filtered or germ-proof fluid from the chamber $d^3$, flowing therefrom through the rose or sprayer $f^2$, coupling $c^9$, and pipes $c^7$ and $c^6$ to and through said pipe $c^{15}$ for utilization.

The mode of operation of the apparatus hereinbefore described is as follows: When the valve C is manipulated by means of its lever $c^4$ so that the respective ports $c$, $c'$, $c^2$, and $c^3$ occupy the positions indicated in Fig. 1, the fluid, such as contaminated water or water containing foreign matter, will flow partially through the pipe $a'$, port $c$ of the valve C and port $c'$ thereof, and inlet $b^4$ in the casting C', and pipe $b^6$ into the coagulant-chamber $b$, and the main portion through the valve C from the pipe $a'$, port $c^2$, and pipe $d$, perforated at $d'$, in the chamber $b^8$, onto and through the diaphragm $d^2$ into the chamber $d^3$, containing suitable filtering media, passing through the same and the perforated diaphragm $f$ into the filtered-fluid-receiving chamber $f'$ and by the rose or sprayer $f^2$ pass off through the coupling $c^9$, pipes $c^7$ and $c^6$ to the opening $c^5$ in the casting C' and by the pipe $c^{15}$ be discharged in a thoroughly-filtered or germ-proof condition for utilization. The supply through the valve C, with a certain percentage of the same influenced by its passage through the coagulant-chamber $b$, will mix with that supply beyond the valve C and preparatory to its discharge through the perforated pipe $d'$ into the chamber $d^3$, thereby aiding in the thorough filtering of the fluid by precipitating certain of the foreign elements of the same by such operation and passage of the fluid through said chambers $b$, $b^8$, and $d^3$ of the apparatus A. If desirable, the filtering-media chamber $d^3$ may be thoroughly sterilized by first causing the valve C, by means of its lever $c^4$, to assume the position as to its respective internal ports $c$, $c'$, $c^2$, and $c^3$ as illustrated in Fig. 4—that is, closed to all the pipe connections with the apparatus—and then by opening the cock $j'$ in the pipe $j$ the steam from the appliance G will pass through the pipe connection $g$, coupling $c^9$, and sprayer $f^2$ into and through the filtering-media chamber $d^3$ and upward through the perforated diaphragm $d^2$ and escape from the chamber $b^8$ through the pipe $j$, thereby thoroughly sterilizing the filtering matter contained in the chamber $d^3$ and as will be observed or indicated by the sight-gage $j^2$. By then cutting off the supply from the appliance G by the turning of the stop-cock $g'$ to required position the filtering media in the chamber $d^3$ may be carbonated to take up or neutralize any gases contained therein by opening the stop-cock $h'$ in the pipe $h$, leading to the said appliance H, connected with the coupling $c^9$. The filtering media may be thoroughly aerated by turning the stop-cock $i'$ to an open position in the pipe $i$, connected with the aerating appliance I. It will be understood that for effecting either of said operations the connections to the other appliances will be cut off from the filtering-media chamber $d^3$.

Among the advantageous features of my invention may be mentioned, first, that the fluid may be thoroughly filtered or rendered germ-proof by reason of the facility with which the apparatus may be kept clean or free from elements tending ordinarily to affect the water or other fluid either by thorough washing or cleansing the filtering-media chamber $d^3$ or agitating, sterilizing, carbonating, or aerating the same, and all without disorganization of the apparatus, and, moreover, with the least possible time and expense incident to either or all of said acts for insuring the best possible resultant effects being obtained upon the fluid to undergo treatment therein, and, second, the fluid when it has undergone the treatment in the apparatus hereinbefore described, due to the influence of the coagulant and manner of supplying a certain percentage of fluid containing said coagulant to the main supply, leaves the apparatus, as practice has demonstrated, free from any traces of alum or the like, and hence in the very best possible or germ-proof condition for subsequent use.

It will be manifestly obvious that as to minor details modifications may be made in my invention without departing from the full scope of the same, and hence I do not wish to be understood as limiting myself to the precise construction and arrangement of all of the parts of the apparatus as illustrated in the accompanying drawings and as hereinbefore explained; but,

Having thus described the nature and objects of my invention, what I claim as new, and desire to secure by Letters Patent, is—

1. A filtering apparatus, comprising a housing provided with a coagulant-chamber, a perforated inlet-pipe, a filtering-media chamber having a perforated roof and bottom, a filtered-fluid receptacle beneath said filtering-media chamber, an outlet from said chamber, a valve provided with an operating-lever and a series of ports and connections from said valve with said coagulant and filtering-media chambers and the outlet of the latter chamber, substantially as and for the purposes described.

2. A filtering apparatus provided with a valve having a series of ports and an operating-lever, said valve adapted to be connected with the supply and discharge from the apparatus, sterilizing, carbonating and aerating appliances connected with the apparatus and outlet for the filtered fluid, substantially as and for the purposes described.

3. A filtering apparatus, comprising a housing provided with a coagulant-chamber having a removable clamp-plate, a perforated pipe located beneath said chamber, a filtering-media chamber provided with a removable perforated roof and bottom, a filtered-fluid-receiving chamber located beneath the same, and a valve with internal ports and an operating-lever connected with said chambers and with the fluid-supply and filtered-fluid discharge of said receiving-chamber, substantially as and for the purposes described.

4. A filtering apparatus, comprising a housing provided with a coagulant-chamber, means for presenting a fluid to a filtering media through a chamber provided with a perforated roof and bottom, a filtered fluid or water receiving chamber provided with a rose, and a combined inlet and outlet therefrom, a valve provided with a series of ports leading by pipe connections to and connected with said apparatus, and means for carbonating, sterilizing or aerating said filtering media, substantially as and for the purposes described.

5. A filtering apparatus, comprising a housing provided with a coagulant-chamber, a valve provided with ports and an operating-lever and said coagulant-chamber connected with said valve-casting and with the supply for the fluid to a filtering-media chamber having a perforated roof and bottom, a rotatable agitating device mounted therein, a filtered-water-receiving chamber located beneath said filtering-media chamber having an outlet to and from said valve-casting, and a waste-outlet above said filtering-media chamber provided with a stop-cock and sight-gage, substantially as and for the purposes described.

In testimony whereof I have hereunto set my signature in the presence of two subscribing witnesses.

SELDEN TWITCHELL.

Witnesses:
J. WALTER DOUGLASS,
THOMAS M. SMITH.